US005822711A

United States Patent [19]

Ochoa-Chavez

[11] Patent Number: 5,822,711

[45] **Date of Patent: *Oct. 13, 1998**

[54] AUTONOMOUS CONTROLLER FOR TRAFFIC SIGNALS

[76] Inventor: Fernando Ochoa-Chavez, Circuiro Madrigal 1975, Colinas de San Javier, Guadalajara, Jalisco C.P., Mexico, 485110

[ * ] Notice: This patent issued on a continued prosecution application filed under 37 CFR 1.53(d), and is subject to the twenty year patent term provisions of 35 U.S.C. 154(a)(2).

[21] Appl. No.: 560,163

[22] Filed: Nov. 20, 1995

[51] Int. Cl.[6] .................................................. G06F 163/00

[52] U.S. Cl. .......................... 701/117; 340/916; 340/932

[58] Field of Search .................................. 701/117, 118, 701/119; 340/907–932

[56] References Cited

U.S. PATENT DOCUMENTS

| | | | |
|---|---|---|---|
| 3,631,387 | 12/1971 | Hill et al. | 340/923 |
| 3,754,209 | 8/1973 | Molloy et al. | 340/912 |
| 3,816,796 | 6/1974 | Molloy et al. | 340/909 |
| 4,250,483 | 2/1981 | Rubner | 340/40 |
| 4,322,801 | 3/1982 | Williamson et al. | 364/436 |
| 4,449,116 | 5/1984 | Hill et al. | 340/909 |
| 4,462,031 | 7/1984 | Johnson | 340/916 |
| 4,463,339 | 7/1984 | Frick et al. | 340/906 |
| 5,257,194 | 10/1993 | Sakita | 364/436 |
| 5,659,305 | 8/1997 | Rains et al. | 340/931 |

*Primary Examiner*—Vincent N. Trans
*Attorney, Agent, or Firm*—Cahill, Sutton & Thomas, P.L.C.

[57] ABSTRACT

An autonomous controller includes a microprocessor, a programmable memory for storing a plurality of cycle structures, a clock/calendar circuit accurate to within a few seconds per month, a lamp driver including a plurality of isolated outputs for operating traffic signals, a display driver for providing a indication of optimum speed through the controlled intersection, and an I/O device coupled between the microprocessor and an external connector for downloading the cycle structures to the programmable memory. The microprocessor reads data from the programmable memory, selects a cycle structure suitable for the time of day, and causes the lamp driver to control the traffic signals in an intersection in accordance with the selected cycle structure.

3 Claims, 2 Drawing Sheets

AUTONOMOUS CONTROLLER FOR TRAFFIC SIGNALS

BACKGROUND OF THE INVENTION

This invention relates to traffic control systems and, in particular, to a traffic controller operating solely on the basis of internal programming and an internal, precise clock. A group of such controllers can control a plurality of intersections without the need for communication among the controllers or for communication between the controllers and an external reference.

Many traffic control systems have been proposed for enabling groups of vehicles to move at a relatively constant speed while encountering green lights at a series of controlled intersections. The underlying concept is quite simple, the traffic signal at a first intersection turns green and the traffic signal at the next intersection turns green after a predetermined delay, called an offset. The offset is determined by the distance between successive traffic signals divided by the desired constant speed.

Although the concept is simple, implementing the concept has proven difficult. For example, the volume of traffic in a particular direction varies with time of day. Emergency vehicles and pedestrians must be accommodated. To accommodate a large number of possible situations, traffic control systems have become complex computer modeling systems operating in real life. Sensors provide data that is communicated to a central computer for analysis and instruction are sent to the units controlling each intersection for implementing the model that best fits the situation.

A model for controlling traffic, and a computer system for implementing that model, is disclosed in U.S. Pat. No. 4,322,801 (Williamson et al.). The model includes a "background cycle" that is modified according to traffic loads and pedestrian demands. In order for traffic to flow at constant speed, the duration of a cycle is fixed and the cycle is modified by adjusting the fraction of the cycle allocated for each "step" of the cycle. Calculating percentages complicates the software and makes it difficult to change the cycle. Thus, the patented system has only two cycle structures and three offsets available.

The traffic signals at an intersection progress through a series of states called steps, e.g. northbound and southbound green while eastbound and westbound are red. A series of steps defines a "cycle structure" in which the steps are non-repeating; that is, when the steps start to repeat, a new cycle has begun. Each step in a cycle structure can be defined as a percentage of the duration of a cycle, as in the Williamson et al. patent, but this is not the only way to define the steps.

If several controllers are linked to a single master controller, then a failure of the master controller, e.g. due to a power outage, means that all the intersections are uncontrolled. Some centrally controlled systems have a soft failure mode in which a basic control sequence is used at each intersection regardless of traffic or time of day. Even with a soft failure mode, the traffic signals at consecutive intersections are uncoordinated. If an intersection is controlled by a local computer, a power outage at the intersection will cause the local computer to become uncoordinated with computers at adjoining intersections.

It is recognized in the art that timing is critical and many proposals have been made to assure that the traffic controllers are properly synchronized. For example, U.S. Pat. No. 4,250,483 (Rubner) discloses a system which must use receivers tuned to the National Bureau of Standard time broadcast on WWV for synchronizing traffic controllers. Providing such receivers for each controller is expensive. Similarly expensive are systems in which dedicated communication links connect the controllers for one-way or two-way communication. The system disclosed in the Rubner patent also includes cycle structures defined in hardware. This makes the system very inflexible and expensive to modify.

Many of the traffic signal controllers proposed in the prior art rely on sophisticated computers for implementation. While effective, such systems are expensive to manufacture and maintain, restricting such systems to local governments that are either relatively prosperous or willing to incur greater debt.

In view of the foregoing, it is therefore an object of the invention to provide an autonomous controller for traffic signals.

Another object of the invention is to provide a low cost controller that is relatively simple in construction and inexpensive to manufacture.

A further object of the invention is to provide a controller that relies on a precise, internal clock for timing.

Another object of the invention is to provide a low cost controller having a large number of possible cycle structures and a large number of offsets.

A further object of the invention is to provide an autonomous controller for traffic signals that can be synchronized with an existing traffic control system without communicating with the system.

Another object of the invention is to provide an autonomous controller for traffic signals that can be combined with additional autonomous controllers to provide a low cost, synchronous, traffic control system.

SUMMARY OF THE INVENTION

The foregoing objects are achieved in this invention in which an autonomous controller includes a microprocessor, a programmable memory for storing a plurality of cycle structures, a clock/calendar circuit accurate to within a few seconds per month, a lamp driver including a plurality of isolated outputs for operating traffic signals, a display driver for providing a indication of optimum speed through the controlled intersection, and an I/O device coupled between the microprocessor and an external connector for downloading cycle structures to the programmable memory.

The microprocessor reads data from the programmable memory, selects a cycle structure suitable for the time of day, and causes the lamp driver to control the traffic signals at an intersection in accordance with the selected cycle structure. The microprocessor also causes the optimum speed to be displayed for motorists passing through the intersection. The cycle structures are generated externally and merely stored in the controller for use in accordance with time of day or other selection criteria.

BRIEF DESCRIPTION OF THE DRAWINGS

A more complete understanding of the invention can be obtained by considering the following detailed description in conjunction with the accompanying drawings, in which.

DETAILED DESCRIPTION OF THE INVENTION

Figure 1:
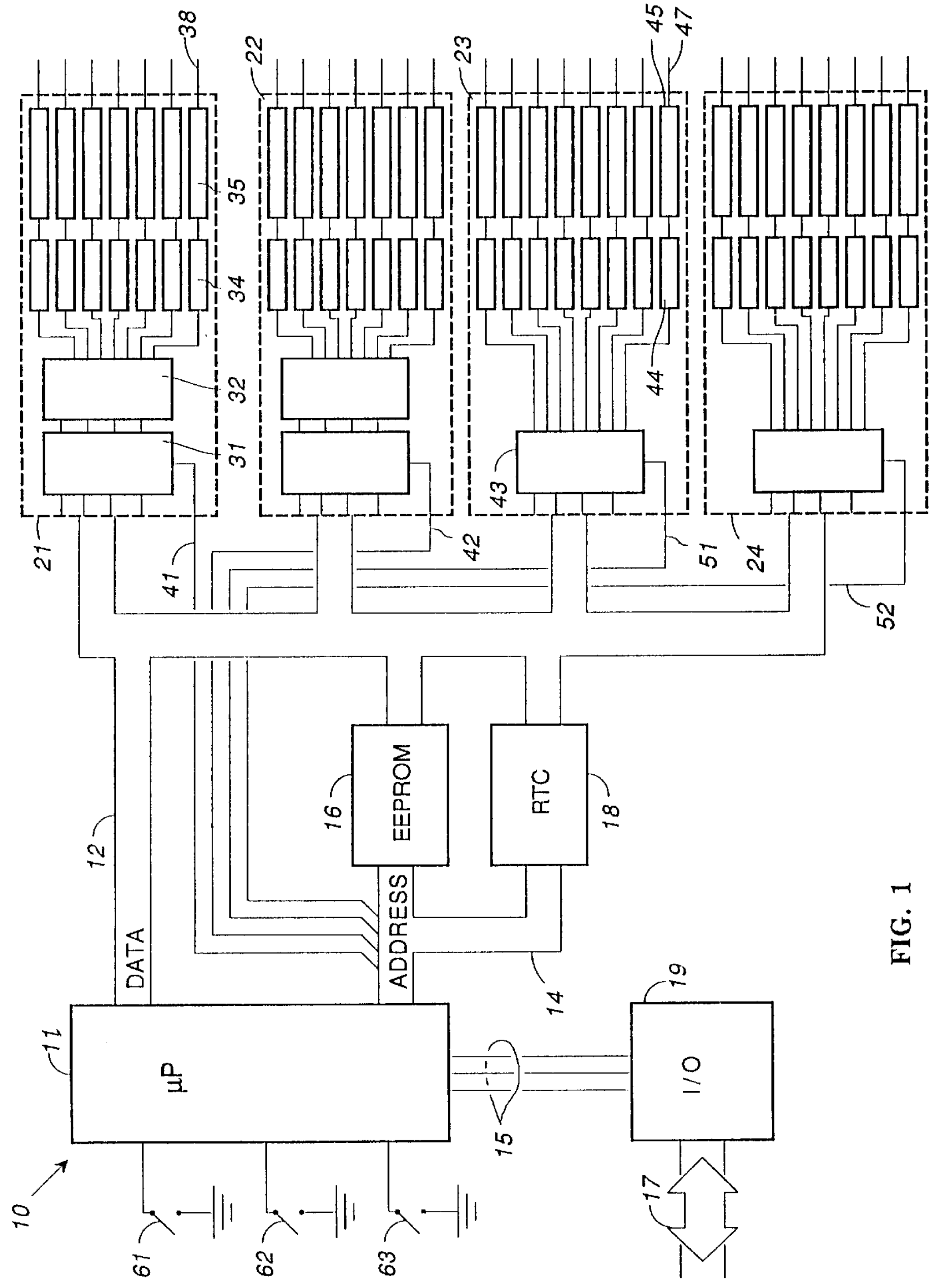
FIG. 1 is a block diagram of an autonomous traffic signal controller constructed in accordance with a preferred embodiment of the invention.

In FIG. 1, controller 10 includes microprocessor 11 coupled to eight-bit data bus 12 and to ten-bit address bus 14. Electrically erasable, programmable, read only memory (EEPROM) 16 and real time clock (RTC) 18 are also coupled to the data bus and to the address bus. Input/output (I/O) device 19 is coupled to microprocessor 11 by serial bus 15. I/O device 19 is coupled to the outside world through bidirectional data bus 17. Data bus 17 terminates in a suitable connector (not shown in FIG. 1) and can be either a serial data port or a parallel data port.

Microprocessor 11, EEPROM 16, RTC 18, and I/O device 19 are preferably socketed or soldered to a printed circuit board having an edge connector or card connector (not shown) coupled to the data bus and to the address bus. A printed circuit board including a power supply and a plurality of edge connectors serves as a "mother board" for receiving a plurality of other cards that plug into the connectors on the mother board. A mother board simplifies construction of the controller and simplifies field service. A "card cage" including cabinet, power supply, and mother board is commercially available from several vendors.

In accordance with the invention, cards 21, 22, 23, and 24 are coupled to the mother board and to microprocessor 11. Cards 21 and 22 are display drivers, each controlling a single digit, seven-segment display. Cards 23 and 24 are lamp drivers and each card has a plurality of individually controlled, isolated outputs for operating the lamps in a traffic signal.

Card 21 includes data latch 31, decoder 32, opto-isolator 34, and triac 35 coupled to output line 38. Latch 31 is an eight bit latch for storing data from data bus 12 when chip select line 41 is active. Data from data bus 12 is stored in latch 31 and coupled to decoder 32, wherein the data is converted from binary coded decimal (BCD) to a seven-segment display. The seven output lines from decoder 32 are coupled to individual opto-isolators, such as opto-isolator 34. The output of opto-isolator 34 is coupled to the gate of triac 35. Output line 38 couples triac 35 to one segment of a seven-segment display (not shown in FIG. 1). The other output lines from decoder 32 are each coupled through an opto-isolator and a triac to the remaining segments in the display. Card 22 is identical to card 21 and is coupled to a second digit of the seven-segment display. If card 21 is coupled to the low order bits (bits 0–3) of data bus 12 and card 22 is coupled to the high order bits (bits 4–7) of the data bus, then cards 21 and 22 can be selected by a single address line instead of by separate address lines as shown.

Card 23 includes data latch 43 coupled through opto-isolator 44 to triac 45 and output line 47. The other output lines of latch 43 are similarly coupled to respective output lines. The output lines from card 23 are coupled one each to individual lamps in a traffic control signal. Whether a given lamp in a traffic control signal is on or off is determined by the data transferred through latch 41 from data bus 12. Card 24 is electrically identical to card 23.

In a preferred embodiment of the invention, the sockets on the motherboard are uniquely addressed. Cards 21–24 are distinguished by the chip select lines coupled to the latches. Card 21 is controlled by chip select line 41 and card 22 is controlled by chip select line 42. Card 23 is controlled by chip select line 51 and card 24 is controlled by chip select line 52. Other addressing techniques could be used but the preferred technique provides a simple structure and interchangeable cards.

EEPROM 16 is programmed during initial assembly of controller 10 or is programmed in the field by way of I/O device 19. Switches 61, 62, and 63 are coupled to individual interrupt inputs of microprocessor 11, enabling external control of the microprocessor. For example, actuating switch 61 causes an interrupt for which the service routine, stored in EPROM within microprocessor 11, provides external programming of EEPROM 16 by way of I/O device 19.

The service routine for switch 62 enables manual control of the traffic signals in an intersection and the service routine for switch 63 causes microprocessor 11 to enter the next phase of a cycle each time that switch 63 is closed. Thus, singular or infrequent events, such as a parade, can be accommodated by controller 10. Manual control causes cards 21 and 22 to blank the display of preferred speed (no segments are turned on).

Real time clock 18 includes a clock/calendar chip and a crystal oscillator that is stable to within a few seconds per month. Such oscillators are known per se in the art and are commercially available. It is the stability of the real time clock and the patterns stored in EEPROM 16 that enable controller 10 to operate autonomously in accordance with the invention.

Clock 18 need not be reset very often because the accumulated error of a few seconds per month is such a small fraction of a day and because the clocks in other controllers will likely drift in the same direction. Thus, the accumulated error in time of day can be a few minutes but the offset error between controllers is likely very much less than that. Thus, it takes many months before the correct time has to be downloaded to each controller. In some applications, changing traffic patterns may require re-programming long before a time correction is needed.

Figure 2:
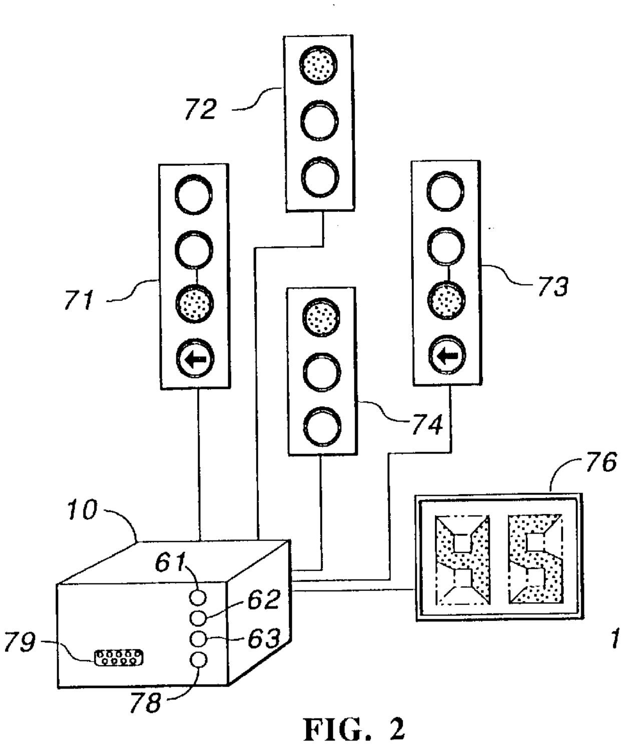
FIG. 2 is a diagram of a small system for controlling the traffic signals at an intersection.

FIG. 2 illustrates a controller constructed in accordance with the invention coupled to four traffic signals and a speed display. Controller 10 operates signals 71, 72, 73 and 74 in a predetermined pattern or sequence in accordance with the data stored in memory. Display 76 is a two digit, seven segment display showing the optimum speed for traffic passing through the intersection controlled by traffic signals 71–74. The front panel of the enclosure for controller 10 includes switches 61, 62, and 63, and on-off switch 78. Connector 79 provides an electrical link to the I/O device within controller 10. Connections to the traffic signals are made through suitable high voltage connectors (not shown) on the rear of controller 10.

The data stored in EEPROM 16 (FIG. 1) is generated by a computer running an appropriate modeling program that constructs the steps for each cycle and the precise time of day at which the cycles must take place. Programming is simplified because the steps are specified as multiples of a minimum period, e.g. one second, rather than in terms of percentage of a cycle. The offsets, step changes etc. are downloaded into EEPROM 16 when controller 10 is assembled or the data is downloaded in the field via I/O device 19.

The offsets programmed into each controller in a group of controllers define the appropriate traffic pattern and the optimum speed. For example, if the optimum desired speed is forty-five miles per hour and two intersections are nine hundred twenty-four feet apart, then one controller begins its cycle fourteen seconds after the other.

Determining the cycle patterns externally and downloading the patterns greatly simplifies the construction of the controller and reduces costs. The only event which could cause traffic signals 71–74 to fail to operate is a power outage. Commercially available, real time clocks typically include a lithium battery as a backup power source in the event of a power outage. Thus, even if microprocessor 11 becomes inoperative, time of day is accurately kept by the real time clock until power is restored. When power is restored, the initialization routine executed by the microprocessor checks for time of day and begins executing the appropriate pattern of traffic control signals for that time of day and day of week.

The number of cycle structures is limited only by the amount of available memory. Programming is simplified if the number of cycle structures, offsets, and steps is limited to 255 for a data bus eight bits wide ($2^8$=256).

In one embodiment of the invention, traffic signal controller 10 included the devices listed in the following table.

TABLE I

| | |
|---|---|
| microprocessor 11 | 8751H |
| EEPROM 16 | 28C16 |
| RTC 18 | 58274 |
| I/O 19 | TC232CP |
| latch 31 | 74C373 |
| decoder 32 | 4511BC |
| opto-isolator 34 | MOC3011 |
| triac 35 | MOC3015 |

This embodiment stored eight different cycle structures that could be executed in any desired sequence and change no more than eleven times during one twenty-four hour period. The number of cycle structures and the number of times that a cycle structure can be changed per day is limited only by the amount of available memory. EEPROM 16 need only store the identity of the pattern and the time for using the pattern, not the pattern itself. Thus, relatively little data can create very complex patterns.

Alternatively, EEPROM 16 stores the cycle patterns. If one wants to change traffic control patterns, new data, calculated on the modeling computer, is downloaded by coupling a portable computer containing the new data to connector 79. Actuating switch 61 causes microprocessor 11 to enter a programming sequence for receiving data from device 19 and storing the data in EEPROM 16.

Figure 3:
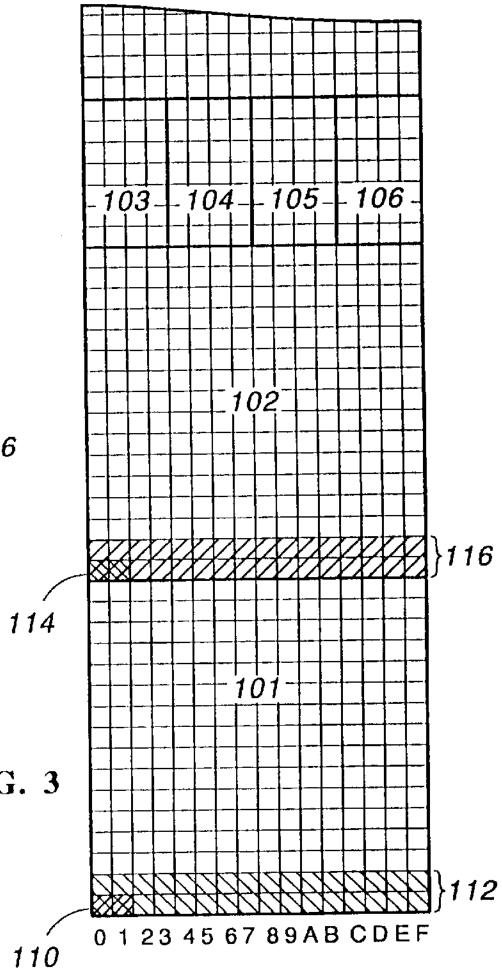
FIG. 3 is a memory map of an EEPROM used in implementing the invention.

FIG. 3 is a memory map of a controller constructed in accordance with the invention and illustrates how relatively little data can produce complex traffic control patterns. The particular EEPROM used can store 2,048 bytes of data but only 1,024 bytes was used, requiring a 10-bit address bus ($A_0$–$A_g$). The memory map includes sixteen columns labeled, in hexadecimal notation, (0–F), addressed by lines $A_0$–$A_3$, and a plurality of rows, addressed by lines $A_4$–$A_g$. Area 101 corresponds, in hexadecimal notation, to addresses (0 00) to (0 FF) and is allocated for storing cycle structures. Area 102 corresponds to addresses (1 00) to (1 FF) and is allocated for storing the duration of the cycles.

In area 101, addresses (0 00) and (0 01) store first step 110 in first cycle structure 112, i.e. a step is a two byte "word." Each cycle can have up to sixteen steps and is allocated two rows (thirty-two bytes) of memory. The data is more easily manipulated if each cycle is allocated a fixed number of bytes than if each cycle were permitted a variable number of bytes. The structure of area 102 is similar. Each duration is allocated thirty-two bytes of storage, whether or not all thirty-two bytes are used.

Area 103 stores offsets, area 104 stores time schedule (1), area 105 stores time schedule (2), and area 106 stores time schedule (3). The time schedule areas store the times for executing a particular cycle and the vehicle speed that will enable a driver to have green lights at consecutive intersections. Up to eleven time schedules are stored per day, seventy-seven per week.

Figure 4:
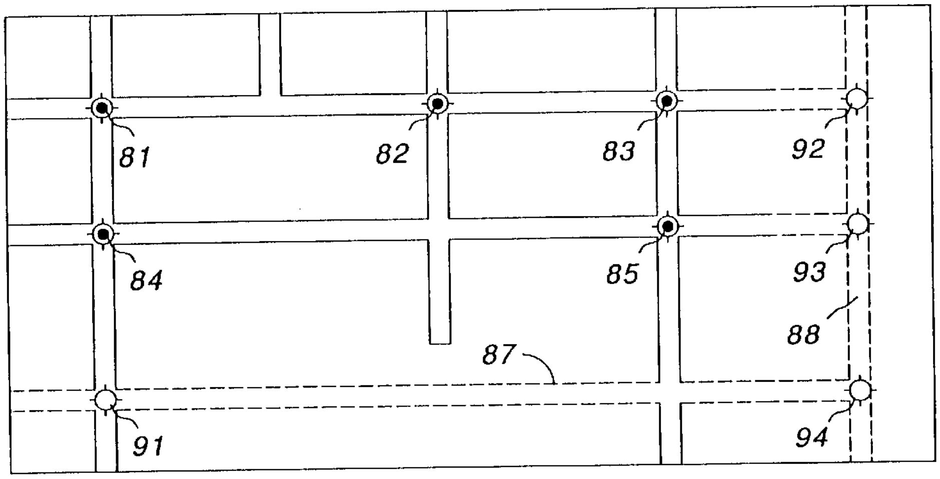
FIG. 4 represents a portion of a street map indicating intersections controlled by a traffic signal.

Although a controller constructed in accordance with the invention is autonomous, a plurality of such controllers can be combined to provide a traffic control system that is as effective as, and much less expensive than, more complicated systems. FIG. 4 represents a portion of a city map in which several streets and intersections are to be added to the city. A typical problem in such a situation is that there is an existing traffic control system and the existing system is either outmoded or operating at capacity.

In FIG. 4, traffic signals 81, 82, 83, 84, and 85 are controlled by a central controller (not shown). Assuming that continued real estate development results in the addition of streets 87 and 88, it will be necessary to add traffic signals 91, 92, 93, and 94. Traffic signal 91 must be synchronized with traffic signal 84. It is an advantage of the invention that traffic signal 91 can be added to the system and controlled in synchronism with traffic signal 84 without any actual communication with the controller for traffic signal 84. One simply defines the cycle structures corresponding to the cycle structures for traffic signal 84, and defines the appropriate offset, and stores the data in the memory of a controller constructed in accordance with the invention. No connection of any kind to traffic signal 84 is necessary.

In accordance with the invention, the controllers for traffic signals 92, 93, and 94 are programmed act in concert with each other and in synchronism with traffic signals 83, 85, and 91, as if the controllers were part of a centrally controlled system or a system in which the controllers communicated with each other.

The invention thus provides an autonomous traffic signal controller that is relatively simple in construction, inexpensive to manufacture, inexpensive to install because no infrastructure is required, flexible in operation, and inexpensive to maintain. The traffic controller includes on a precise, internal clock for timing and can store a large number of cycle structures and offsets. Several autonomous controllers can be synchronized with each other to provide a coordinated traffic control system and an autonomous controller can be combined with an existing system to expand the capability of the existing system.

Having thus described the invention, it will be apparent to those of skill in the art that various modifications can be made within the scope of the invention. For example, SCR's or other high voltage switching devices can be used for triacs. (As known in the art, "high" voltage is relative to the nominal 3–10 volts at which integrated circuits operate. Traffic signals typically operate at 110 volts or 230 volts.) The number of cards depends upon the number of lamps to be controlled, e.g. controller 10 could include six cards, two cards for the display and four cards for separately controlling up to thirty-two lamps, including turn signals and "walk" lights. As known to those of skill in the art, the "fan-out" limits for integrated circuits may require the use of buffers or line drivers if a large number of cards is used. In some applications, costs can be further reduced by substituting a prom for the EEPROM. The memory map in FIG. 3 is for example only and is not the only way data can be stored in memory. Additional memory increases the number of available cycle structures, stored as tables in memory within microprocessor 11 or in memory external to the microprocessor.

The described preferred embodiment is a minimal system that includes a cable connection for downloading data from a portable computer to a controller. Low cost, low power, RF transceivers can be added to the system to provide a convenient alternative to a portable computer and cable. For example, using a low power transceiver, a traffic engineer driving by each controller can re-program the controller simply by transmitting data to the controller. A receiver in the controller performs the same functions as switch 61 and connector 79. Such a receiver is not like receivers of the prior art. For example, reception of WWV timing signals is subject to the vagaries of propagation, requiring a sensitive, selective, multi-band receiver that is not usable for programming cycle structures. The receiver is usable only for receiving timing information. A low power transmitter in a vehicle passing less than three hundred feet from a controller does not encounter propagation problems and does not require a sophisticated receiver. A low cost receiver or transceiver can be used in the autonomous controller.

What is claimed as the invention is:

1. A system for controlling traffic signals at a plurality of intersections, said system comprising:

a first autonomous controller for controlling the traffic signals at a first intersection; and an autonomous controller at each of the remaining of said plurality of intersections;

each of said autonomous controllers, including said first autonomous controller, having a real time clock accurate to within a few seconds per month for indicating the time of day;

each of said autonomous controllers, including said first autonomous controller, having a memory circuit for storing two or more cycle structures for traffic signals intended for use at different times of day;

wherein the controllers at each intersection act in concert with each other by depending upon the time of day indicated by the real time clock within each such controller without communication among the controllers, and without communication between the controllers and an external reference more frequently than once per month.

2. The system as set forth in claim 1 wherein each controller comprises:

a microprocessor coupled to a data bus and to an address bus;

said memory circuit being coupled to said data bus and to said address bus, said memory circuit storing data representative of cycle structures for traffic signals; said real time clock being coupled to said microprocessor for providing signals indicating the actual time of day;

a lamp driver coupled to said data bus and to said address bus, said lamp driver including a plurality of isolated outputs for operating said traffic signals;

wherein said microprocessor reads said electrical signals, selects a cycle structure in said memory circuit in accordance with the time of day, and causes said lamp driver to control said isolated outputs in accordance with the selected cycle structure.

3. A method for controlling traffic signals at a plurality of intersections, said method comprising the step of:

a. providing an autonomous controller at each of the plurality of intersections for controlling traffic signals at each of the plurality of intersections, each of such autonomous controllers including a real time clock accurate to within a few seconds per month;

b. storing within each such autonomous controller two or more cycle structures that determine the manner in which the traffic signals are to be controlled, each of such cycle structures being intended for use during a particular time of day;

c. operating each autonomous controller to select a particular stored cycle structure in accordance with the time of day indicated by the real time clock;

d. initially synchronizing the real time clocks within the plurality of autonomous controllers to the same time of day; and e. periodically resynchronizing the real time clocks within the plurality of autonomous controllers to the same time of day no more frequently than once per month to account for inaccuracies between such real time clocks.

* * * * *